United States Patent
McConville et al.

(10) Patent No.: US 9,068,522 B2
(45) Date of Patent: Jun. 30, 2015

(54) METHOD FOR DIAGNOSING AN ENGINE

(75) Inventors: Gregory Patrick McConville, Ann Arbor, MI (US); Allan Roy Gale, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 533 days.

(21) Appl. No.: 13/457,783

(22) Filed: Apr. 27, 2012

(65) Prior Publication Data

US 2013/0283782 A1    Oct. 31, 2013

(51) Int. Cl.
| | | |
|---|---|---|
| F02D 23/00 | (2006.01) | |
| F02B 3/00 | (2006.01) | |
| F02B 5/00 | (2006.01) | |
| F02P 5/00 | (2006.01) | |
| F02M 51/00 | (2006.01) | |
| F23N 5/00 | (2006.01) | |
| F02D 41/00 | (2006.01) | |
| F02D 41/14 | (2006.01) | |
| F02D 41/22 | (2006.01) | |
| F02B 37/18 | (2006.01) | |

(52) U.S. Cl.
CPC ........ *F02D 41/0007* (2013.01); *F02D 41/1454* (2013.01); *F02D 41/221* (2013.01); *F02D 2200/0404* (2013.01); *F02D 2200/0406* (2013.01); *F02D 2200/1015* (2013.01); *Y02T 10/40* (2013.01); *Y02T 10/144* (2013.01); *F02B 37/18* (2013.01)

(58) Field of Classification Search
CPC ...... F02B 77/08; F02B 37/18; F02D 41/0007; F02D 41/1454; F02D 41/221; F02D 2200/0404; F02D 2200/0406; F02D 2200/1015; F02D 2041/001; F01L 1/34; F01L 2009/04; F01L 2009/0413; Y02T 10/44; Y02T 10/46; Y02T 10/126; Y02T 10/144; F23N 5/203; F23N 2027/38; F23Q 23/02; F23Q 7/12; G05B 9/02; G05B 11/32; G05B 13/02; G05B 19/02
USPC ............ 60/600–603; 123/472, 478–479, 299, 123/305, 406.11, 406.14, 406.27, 123/90.15–90.17; 701/103–105; 361/93.7, 361/152, 275.3; 431/66; 322/28
See application file for complete search history.

(56) References Cited

U.S. PATENT DOCUMENTS

| | | | | |
|---|---|---|---|---|
| 2,546,758 | A * | 3/1951 | Lawry, Jr. ...................... | 322/28 |
| 3,532,451 | A * | 10/1970 | Willson ......................... | 431/66 |
| 5,497,751 | A * | 3/1996 | Ohtake ......................... | 123/479 |
| 5,504,682 | A | 4/1996 | Shiraishi et al. | |
| 6,598,584 | B2 * | 7/2003 | Beck et al. ...................... | 123/299 |
| 6,637,205 | B1 * | 10/2003 | Ahmad et al. .................. | 60/608 |
| 7,036,482 | B2 * | 5/2006 | Beck et al. ...................... | 123/229 |
| 7,243,532 | B2 | 7/2007 | Tsujimura et al. | |
| 7,665,558 | B2 | 2/2010 | Akimoto et al. | |
| 2009/0050118 | A1 * | 2/2009 | Delp et al. ...................... | 701/103 |
| 2012/0055153 | A1 * | 3/2012 | Murata et al. ................... | 60/602 |
| 2013/0247564 | A1 * | 9/2013 | Nicholson et al. ............... | 60/602 |

FOREIGN PATENT DOCUMENTS

KR    2003-0016683  A  *  3/2003  ............. F02D 41/22

* cited by examiner

*Primary Examiner* — Thai Ba Trieu
(74) *Attorney, Agent, or Firm* — Julia Voutyras; Alleman Hall McCoy Russell & Tuttle LLP (57) ABSTRACT

A method for operating an engine in response to a waste gate position is presented. In one example, the method adjusts an actuator to reduce the possibility of misfire in an engine cylinder in response to waste gate position. In this way, it may be possible to adjust engine operation for varying engine operating conditions.

17 Claims, 4 Drawing Sheets

METHOD FOR DIAGNOSING AN ENGINE

FIELD

The present description relates to a method for diagnosing operation of an engine. The method may be particularly useful for engines that include a turbocharger.

BACKGROUND AND SUMMARY

Internal combustion engines in vehicles may be subject to a wide range of operating conditions and fuels. The operating conditions may increase or decrease fuel vaporization within the engine, thereby making it more difficult to start and operate the engine. Further, different fuel distributors may supply fuels that have higher or lower volatility than fuels supplied by other fuel distributors. The volatility of the fuel may also make starting the engine more difficult. One consequence of operating the engine over a wide range of conditions with varying fuel types is engine misfire. An air-fuel mixture introduced to the cylinder may not combust or may partially combust as a result of low fuel volatility during colder temperatures. In some engines, injected fuel amount, spark timing, and/or the effective compression ratio may be adjusted to improve the possibility of combusting the air-fuel mixture and reducing misfire. However, it may not be desirable to adjust an amount of fuel supplied to an engine, engine spark timing, or effective compression ratio unless misfire is detected.

Engine misfire may be detected by monitoring engine speed. If an air-fuel mixture in a cylinder does not combust or partially combusts, engine torque may be reduced. As a result, engine speed may decline for at least a portion of an engine cycle. However, changes in engine speed related to misfire may be less noticeable for engines having a higher number of cylinders. For example, it may be more difficult to detect a misfire of an eight cylinder engine as compared to a four cylinder engine. Additionally, it may be more difficult to detect a misfire at higher engine speeds since engine combustion events are spaced closer together in time.

The inventors herein have recognized the above-mentioned disadvantages and have developed a method for operating an engine, comprising: adjusting an actuator to adjust a pressure in a cylinder in response to a position of a waste gate during a blow-down portion of a cycle of the cylinder.

Engine misfire may be determined from a position of a turbocharger waste gate and/or an amount of current supplied to a waste gate actuator to control position of the turbocharger waste gate. In particular, pressure from a combusted mixture increases pressure in the exhaust manifold when exhaust is released from a cylinder via opening a cylinder exhaust valve. The increased exhaust manifold pressure can exert force on a turbocharger waste gate causing the position of the waste gate to deflect from a desired position. The deflection of the waste gate may be indicative of a misfire. For example, a cylinder combusting an air-fuel mixture may generate a first pressure in a cylinder when the air-fuel mixture completely combusts. On the other hand, an equivalent air-fuel mixture may generate a second, lower pressure, when the air-fuel mixture is only partially combusted. Thus, the waste gate position may change by a greater amount from a desired position when the air-fuel mixture is completely combusted and released from the cylinder to the exhaust manifold. As such, the waste gate position may be a good indicator of whether or not misfire occurs in an engine cylinder. And, once misfire is detected, cylinder pressure may be increased by adjusting an actuator that reduces the possibility of misfire.

The present description may provide several advantages. Specifically, the approach may provide a reliable way to determine engine misfire in turbocharged engines. Additionally, the approach may provide a cross-check to other misfire detection methods such as misfire detection using engine speed. Further, the approach may be more reliable than other engine misfire detection schemes during particular engine operating conditions, such as during engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
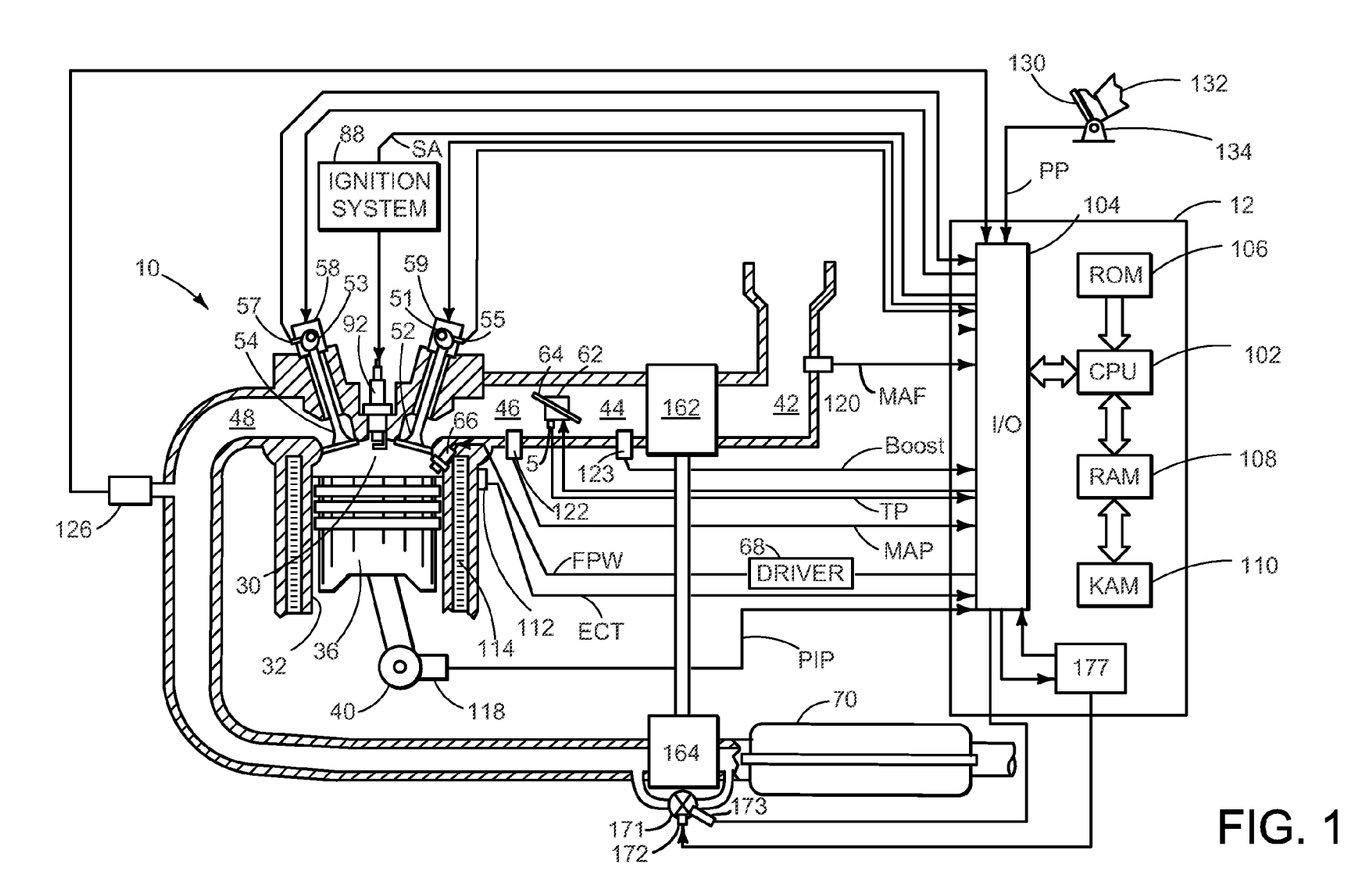
FIG. 1 is a schematic diagram of an engine.
Figure 2:
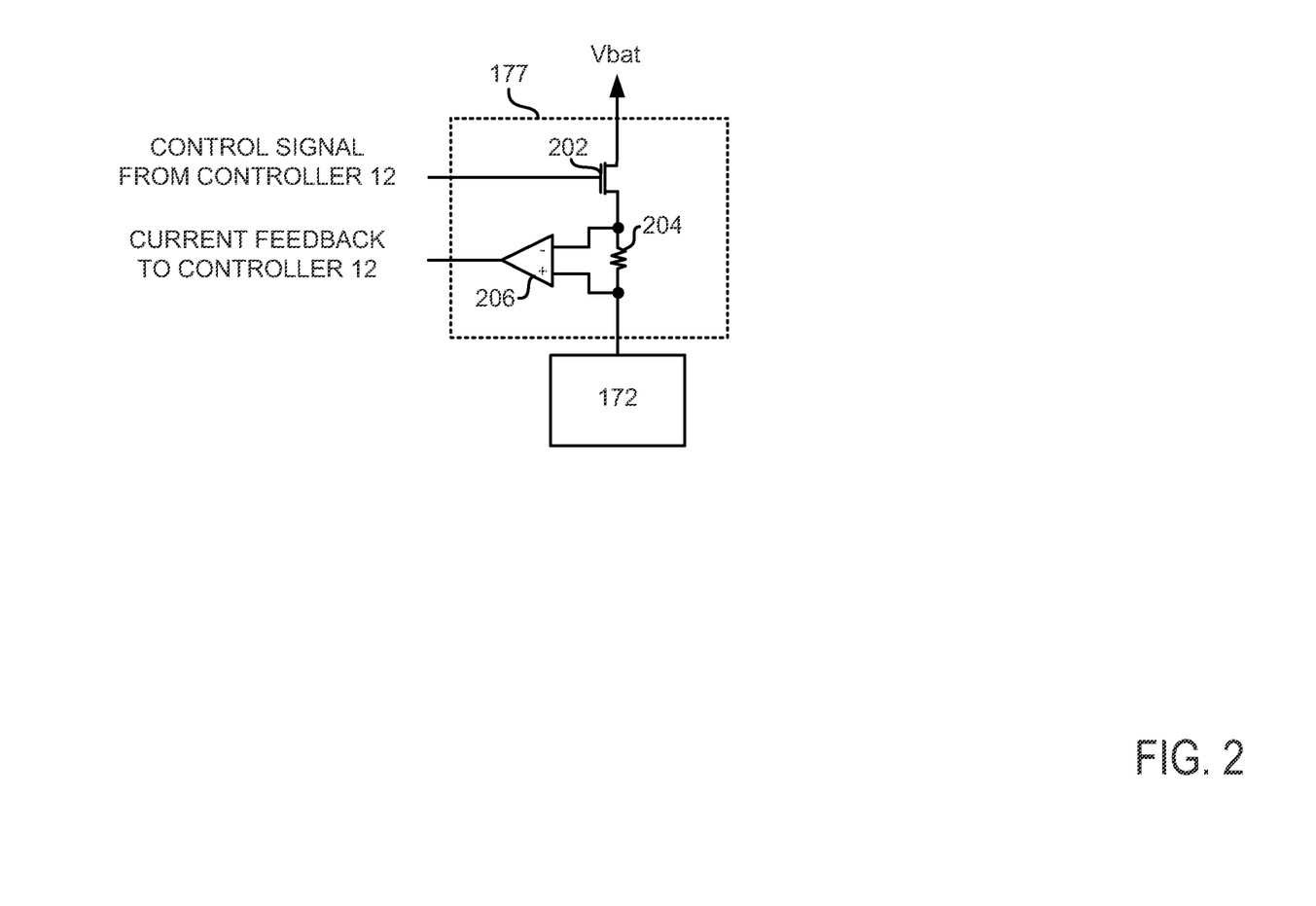
FIG. 2 shows an example circuit for determining waste gate control current.
Figure 3:
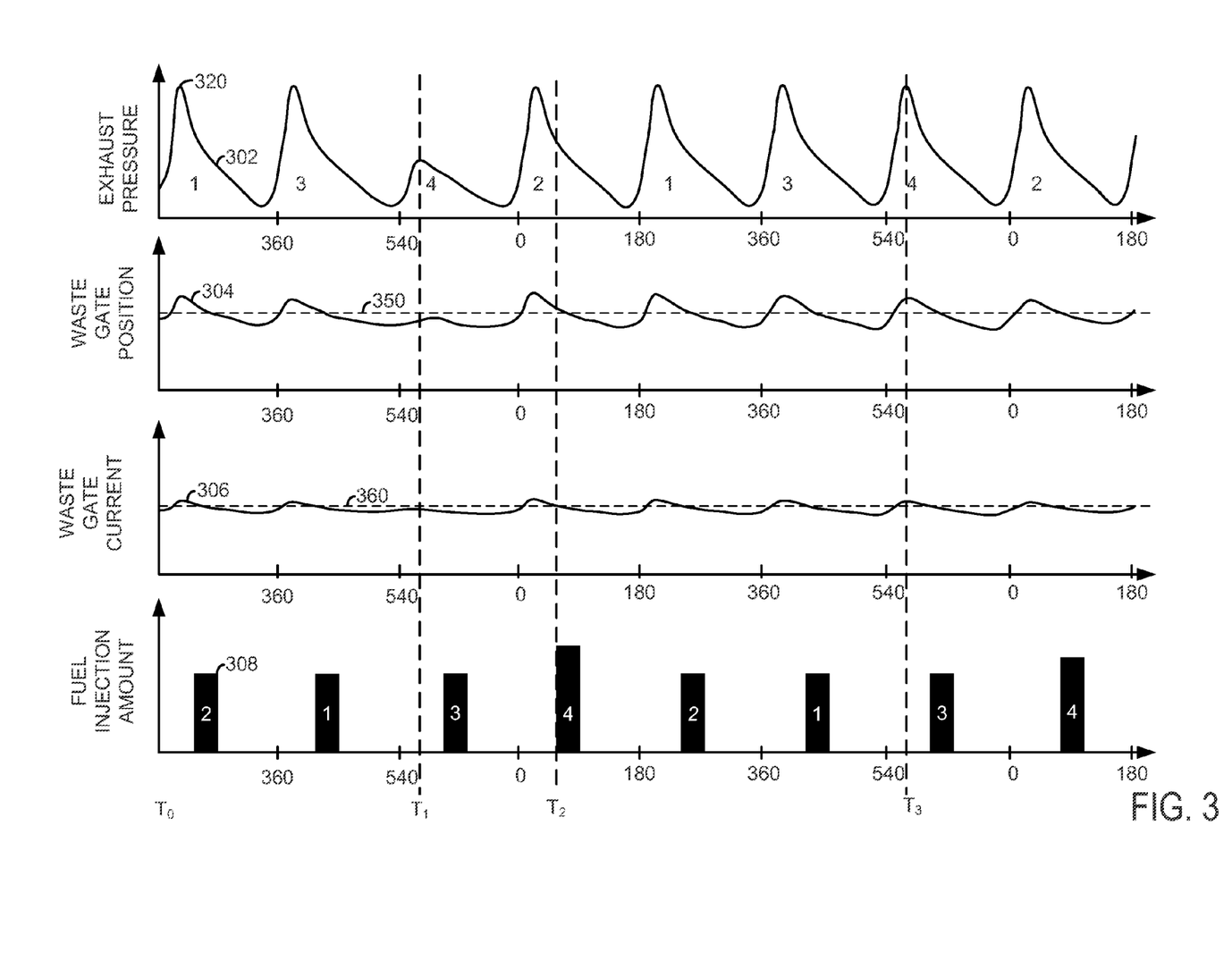
FIG. 3 shows a simulated example misfire detection sequence.
Figure 4:
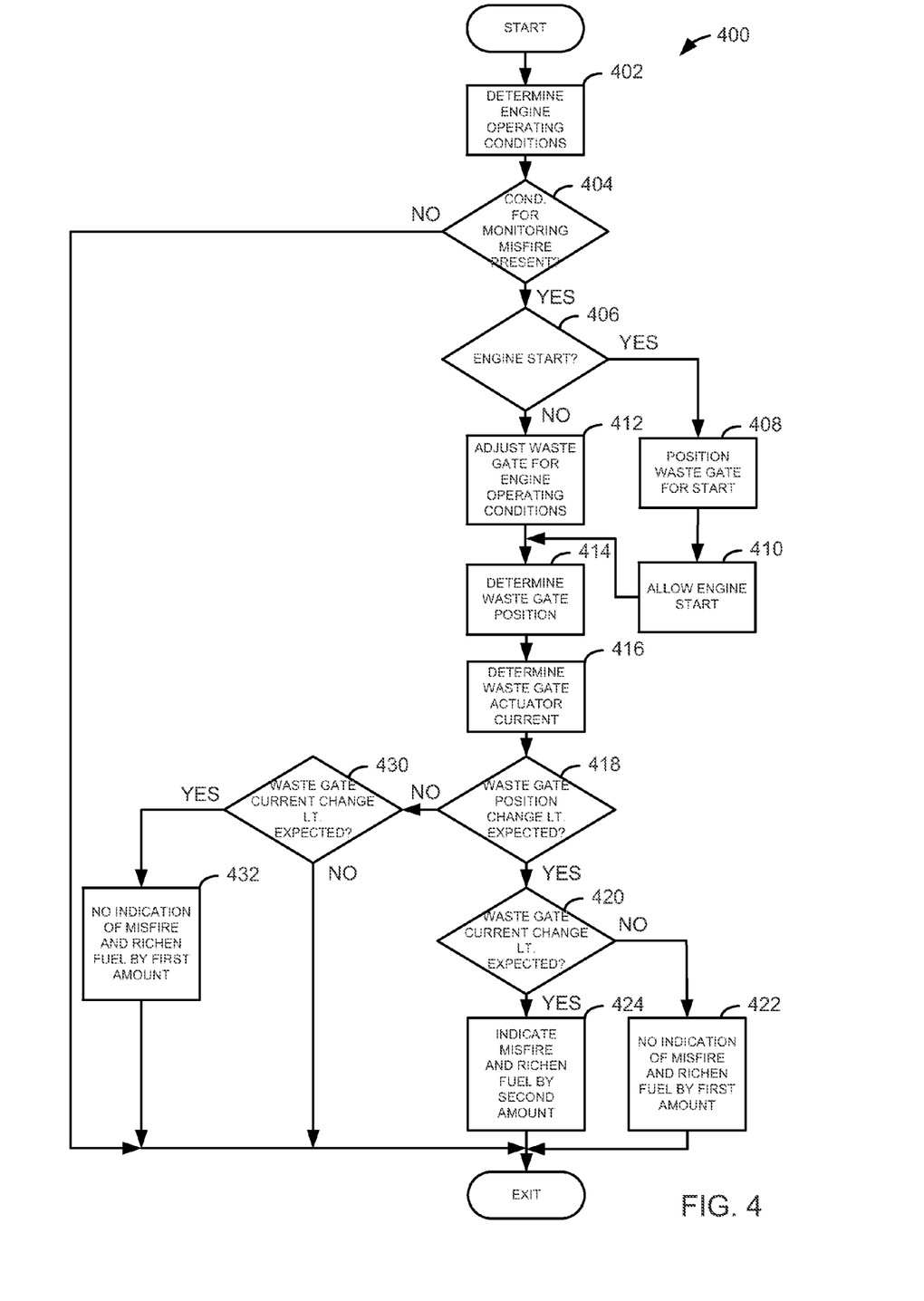
FIG. 4 is an example flowchart of a method for detecting and compensating for engine misfire.

The present description is related to detecting and compensating for engine misfire. In one non-limiting example, the engine may be configured as illustrated in FIG. 1. The engine includes a turbocharger with a waste gate, and the waste gate includes a position sensor to determine a position of the waste gate. FIG. 2 shows an example circuit for determining an amount of current supplied to the waste gate when the waste gate is an electrically actuated waste gate. FIG. 3 shows an example sequence where waste gate position and/or current are a basis for determining engine misfire. Finally, FIG. 4 shows an example method for detecting and compensating engine misfire.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57.

Intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162, thereby compressing air that enters the engine. Waste gate 171 may be at least partially opened as pressure in boost chamber 44 reaches a threshold pressure. In this example, waste gate 171 includes an electrically operated waste gate actuator 172. The electrically operated waste gate actuator 172 may be a motor, solenoid, or other electrical actuator. The position of waste gate 171 may be determined via waste gate position sensor 173. Waste gate current control circuit 177 monitors and controls current to electrically operated waste gate actuator 172.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbocharger compressor 164 and catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold absolute pressure (MAP) from pressure sensor 122 coupled to intake manifold 46; a measurement of boost pressure from pressure sensor 123; a measurement of air mass entering the engine from sensor 120; and a measurement of throttle position from a sensor 5. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows an example circuit for determining waste gate control current. The waste gate control current may be used as a basis for determining whether or not a misfire has occurred in a cylinder. For example, if the engine rotates through a crankshaft region where a cylinder is in a blow-down condition (e.g. where an exhaust valve of the cylinder is open), and current is not adjusted to an expected level, it may be determined that the exhaust pressure is not as high as is desired. In some examples, if the waste gate current is particularly low during or after a cylinder blow-down event, it may be determined that a misfire has occurred in the cylinder.

The waste gate current control circuit 177 includes field effect transistor 202 and current sense resistor 204. Field effect transistor 202 controls current flow to electrically operated waste gate actuator 172 when commanded by controller 12 of FIG. 1. A voltage develops across current sense resistor 204 when a current flows through current sense resistor 204. Amplifier 206 senses the voltage and sends an amplified output to controller 12 of FIG. 1. Controller 12 of FIG. 1 compares the output of amplifier 206 to an expected output at the present operating conditions. Additionally, controller 12 of FIG. 1 may compare output from amplifier 206 to an expected or desired output at particular engine crankshaft intervals. In particular, the output of amplifier 202 may be compared to a desired output while a cylinder is in a blow-down portion of the cylinder's cycle. In one example, the desired waste gate current may be empirically determined and stored in tables or functions in memory of controller 12 of FIG. 1. The tables or functions may be indexed by engine speed and requested torque.

Referring now to FIG. 3, a simulated example misfire detection sequence is shown. FIG. 3 includes four plots. In each of the four plots, the X axis represents engine crankshaft angle. The sequence of FIG. 3 may be provided by the system of FIGS. 1 and 2 executing the method of FIG. 4. Vertical markers at time $T_1$-$T_3$ indicate particular times of interest in the sequence. The sequence is representative for a four cylinder, four stroke, engine where cylinder strokes are spaced at 180 crankshaft degree intervals. The crankshaft angles 0, 180, 360, and 540 are crankshaft angles referenced to top-dead-center compression stroke of cylinder number one. Thus, when the engine is at zero crankshaft degrees, the piston of cylinder number one is at top-dead-center compression stroke. Cylinder number three is at bottom-dead-center compression stroke when the engine is at zero. Cylinder number four is at top-dead-center exhaust stroke when the engine is at zero crankshaft degrees. Cylinder number two is at bottom-dead-center exhaust stroke.

The first plot from the top of FIG. 3 represents exhaust pressure in an engine exhaust system upstream of a turbocharger waste gate versus engine crankshaft angle. Exhaust pressure increases in the direction of the Y axis arrow. The numbers 1-4 below exhaust pressure trace 302 indicate the cylinder that produced the pressure increase in trace 302. For example, the number 1 indicates that exhaust from cylinder number one produced the pressure increase at 320.

The second plot from the top of FIG. 3 represents turbocharger waste gate position versus engine crankshaft angle. The waste gate position represented by the turbocharger waste gate position trace 304 indicates the waste gate opens further in the direction of the Y axis arrow. The turbocharger waste gate position indicates a closed waste gate when the position trace is at the X axis. Horizontal line 350 represents a desired waste gate position during a crankshaft interval when the exhaust valve of a cylinder is open. In some examples, horizontal line 350 may represent a minimum waste gate opening or closing position depending on whether the waste gate is normally open or closed.

The third plot from the top of FIG. 3 represents turbocharger waste gate control current (e.g., the current supplied to the waste gate) versus engine crankshaft angle. The amount of current represented by the turbocharger waste gate control current trace 306 increases in the direction of the Y axis arrow. Horizontal line 360 represents a desired waste gate current to provide the desired waste gate position during a crankshaft interval when the exhaust valve of a cylinder is open. In some examples, horizontal line 360 may represent a minimum waste gate current.

The fourth plot from the top of FIG. 3 represents an amount of fuel injected into engine cylinders during the sequence versus engine crankshaft angle. Fuel injection amount 308 and similar fuel injection amounts indicate that the injected fuel amount increases in the direction of the Y axis arrow. The numbers 1-4 located in the fuel injection amount indicate into which cylinder the particular amount of fuel is injected. For example, fuel injection amount 308 is injected to cylinder number two.

The sequence begins at time $T_0$ where all engine cylinders are receiving substantially a same amount of fuel. Further, although exhaust pressure from all cylinders is not shown prior to time $T_1$, pressure pulses from all cylinders are at a higher level as indicated at 320. The pressure pulses impact the turbocharger waste gate and cause a deflection in the waste gate position. For example, pressure pulse 320 causes the change in waste gate position indicated at 304. Controller 12 of FIG. 1 increases the waste gate current as shown at 306 to drive the waste gate back toward the desired waste gate position 350. The waste gate current is decreased as the waste gate returns to the desired position. In this way, the waste gate current and position are adjusted as pressure pulses from cylinder exhaust impact the waste gate. The actual waste gate position and current vary about desired waste gate position and current.

Shortly before time $T_1$, cylinder number four misfires or partially combusts the air-fuel mixture in cylinder number four. Consequently, when the exhaust valve of cylinder number four opens just before time $T_1$, pressure in cylinder number four is at a relatively low level. The pressure increase in the exhaust system due to the exhaust valve of cylinder number four opening reaches a peak value at time $T_1$. The peak exhaust pressure value is well below the level of exhaust pressure produced by cylinders that are adjacent to cylinder number four in the engine combustion order (e.g., 1-3-4-2). Accordingly, the waste gate position deflection away from the desired waste gate position at time $T_1$ is reduced. Further, the waste gate current is not increased as much as when a cylinder that does not misfire is exhausted into the exhaust system.

Controller 12 of FIG. 1 recognizes that both the waste gate current and position do not change as is expected when combustion products of a cylinder are released to the exhaust system. Controller 12 may recognize waste gate current and position are not at desired states as discussed in the description of FIG. 4. Consequently, the amount of fuel injected to cylinder number four is increased at time $T_2$ by increasing fuel injector pulse width as the engine continues to rotate. By increasing the amount of fuel injected, it may be possible to reduce the possibility of misfire in cylinder number four. Thus, it can be seen that the amount of fuel injected to cylinder number four at time $T_2$ is greater than the amount of fuel injected to other engine cylinders. The amount of fuel injected to the cylinder that misfires may be increased for a predetermined number of combustion events of the cylinder that misfired. For example, the amount of fuel injected to cylinder number four may be increased for 10 combustion events of cylinder number four. Such fuel enrichment allows cylinder number four to heat to a level where the possibility of misfire may be reduced. Cylinder numbers one, two, and three continue to operate the same as before the misfire at time $T_1$ since misfire is not detected in these cylinders.

Shortly before time $T_3$, cylinder number four combusts the fuel injected at time $T_2$ and exhausts the byproducts to the exhaust system at time $T_3$. The exhaust pressure at time $T_3$ is significantly greater than the exhaust pressure at time $T_1$ indicating that cylinder number four has not misfired. Thus, enriching the air-fuel mixture by increasing the amount of fuel injected at time $T_2$ had the desired result of reestablishing combustion and increasing cylinder pressure in cylinder number four. The amount of fuel enrichment may be reduced over a predetermined number of combustion cycles of cylinder number four before the amount of fuel injected to cylinder number four reaches the amount of fuel injected to other engine cylinders.

In this way, misfire in an engine cylinder may be detected via a turbocharger waste gate and via current supplied to control waste gate position. In some examples, the turbocharger waste gate position may be sampled at predetermined crankshaft intervals where exhaust valves of the cylinders are open and expelling combustion byproducts to the exhaust system.

Referring now to FIG. 4, an example flowchart of a method for detecting and compensating engine misfire is shown. The method of FIG. 4 may be stored as executable instructions in non-transitory memory of a controller, such as controller 12 of FIG. 1. The method of FIG. 4 may provide an operating sequence as is illustrated in FIG. 3.

At 402, method 400 determines engine operating conditions. Engine operating conditions may include but are not limited to engine speed, engine position, turbocharger waste gate position, and waste gate current. Method 400 continues to 404 after engine operating conditions are determined.

At 404, method 400 judges whether or not conditions for monitoring engine misfire are present. In one example, engine misfire may be monitored when engine speed and load are within predetermined values. If method 400 judges that conditions are present to monitor engine misfire, the answer is yes and method 400 proceeds to 406. Otherwise, the answer is no and method 400 proceeds to exit.

At 406, method 400 judges whether or not the misfire monitoring is during an engine start. In one example, method 400 judges engine misfiring is during a start when engine speed is less than a threshold and when an engine start flag is asserted. If method 400 judges that engine misfire is being monitored during an engine start, the answer is yes and method 400 proceeds to 408. Otherwise, the answer is no and method 400 proceeds to 412.

At 408, method 400 positions the waste gate for engine starting. In one example, the waste gate position is adjusted based on a waste gate operating angle or position where more than a threshold level of waste gate defection or movement is provided when a given exhaust pressure is applied to the waste gate. In other words, the waste gate is opened to a position that increases the detectability of pressure pulses imparting force to the waste gate. Method 400 proceeds to 410 after the waste gate position is adjusted.

At 410, method 400 allows the engine to start after the waste gate position is adjusted. The engine may be allowed to start by engaging the engine starter and enabling fuel flow to the engine. Method 400 proceeds to 414 after the engine is allowed to start.

At 412, method 400 adjusts turbocharger waste gate position for engine operating conditions. In one example, turbocharger waste gate positions are empirically determined and stored in tables or functions within controller memory. The tables or functions are indexed via engine speed and load. Further, the turbocharger waste gate may be operated in response to boost pressure. In particular, if boost pressure increases to a level that is higher than is desired, the waste gate may be opened further. Method 400 proceeds to 414 after waste gate position is adjusted for engine operating conditions.

At 414, method 400 determines turbocharger waste gate position. In one example, turbocharger waste gate position may be determined via a position sensor as shown in FIG. 1. The turbocharger waste gate position may be monitored over select crankshaft intervals. For example, turbocharger waste position may be sampled over a particular crankshaft angular interval where exhaust pressure is expected to be highest. In this way, turbocharger waste gate position sampling may be adjusted to engine crankshaft locations where the turbocharger waste gate position exhibits a high signal to noise ratio. Method 400 proceeds to 416 after turbocharger waste gate position is determined.

At 416, method 400 determines turbocharger waste gate actuator current. Turbocharger waste gate current may be determined via the circuit shown in FIG. 2. Similar to monitoring waste gate position, the turbocharger waste gate current may be monitored over select crankshaft intervals. In particular, turbocharger waste current may be sampled over a selected crankshaft angular interval where exhaust pressure is expected to be highest and where the controller is expected to take corrective action and adjust the turbocharger waste gate actuator. In this way, turbocharger waste gate current sampling may be adjusted to engine crankshaft locations where the turbocharger waste gate current exhibits a high signal to noise ratio. In one example, method 400 samples current of the waste gate only when an exhaust valve of a cylinder is open. Method 400 proceeds to 418 after turbocharger waste gate current is determined.

Additionally, current supplied to the turbocharger waste gate actuator may be adjusted at 416 by subtracting the measured waste gate actuator position from a desired waste gate position and then multiplying the waste gate position error by a function that relates position error to a waste gate actuator current adjustment. The waste gate current adjustment added to a base waste gate current and then output to the waste gate actuator.

At 418, method 400 judges whether or not the position of the turbocharger waste gate has changed less than an expected amount during a particular crankshaft interval. For example, where cylinder number one of an engine has an exhaust valve opening duration of 260 crankshaft degrees beginning 40 crankshaft degrees before bottom-dead-center exhaust stroke of cylinder number one, method 400 may begin sampling turbocharger waste gate position and waste gate current at 40 crankshaft degrees before bottom-dead-center exhaust stroke of cylinder number one for judging whether or not exhaust pressure from cylinder number one has changed turbocharger waste gate position less than is expected.

In one example, the turbocharger waste gate position is compared to empirically determined values stored in tables and/or functions in memory. The tables and/or functions may be indexed via engine speed and load or other similar variable. If the waste gate position has not changed less than expected (e.g., the waste gate position has changed by an expected amount) or if the waste gate is not opened or closed as far as expected (e.g., depending on whether the waste gate is normally open or closed), method 400 proceeds to 430. Otherwise, method 400 proceeds to 420.

At 430, method 400 judges whether or not waste gate current has changed less than a desired amount. The waste gate current may be sampled during the same crankshaft interval as the waste gate position is sampled. In one example, the turbocharger waste gate current is compared to empirically determined values stored in tables and/or functions in memory. The tables and/or functions may be indexed via engine speed and load or other similar variable. If the waste gate current has not changed less than is expected or if the waste gate current is not lower or higher than expected (e.g., the waste gate current has changed as expected), method 400 proceeds to exit. Otherwise, method 400 proceeds to 432.

At 432, method 400 richens fuel supplied to the cylinder that exhausted cylinder contents without the waste gate current changing as much as expected while the waste gate position changed within an expected range. In some examples, the timing that spark is delivered to the cylinder as well as spark energy delivered to the cylinder are also adjusted. For example, the spark timing may be retarded in an effort to reduce the possibility of misfire. Spark energy can be increased via increasing ignition coil dwell time. Engine cylinder misfire is not indicated at 432 because one way to determine engine misfire (e.g., waste gate current) may be more sensitive than the other way to determined engine misfire at the present engine operating conditions. Thus, compensation is provided to adjust cylinder operation away from conditions that may increase the possibility of misfire, yet misfire is not indicated because it is not confirmed by both waste gate current and waste gate position. In other examples, an indication of misfire may be provided when misfire is determined only via waste gate current or waste gate position. Spark and fuel delivery to other cylinders that exhaust cylinder contents to provide the desired change in waste gate current remain unchanged. Method 400 proceeds to exit after compensation is provided.

At 420, method 400 judges whether or not waste gate current has changed less than a desired amount. If the waste gate current has not changed less than is expected, or if the waste gate current is not lower or higher than expected (e.g., the waste gate current has changed as expected), method 400 proceeds to 422. Otherwise, method 400 proceeds to 424.

At 422, method 400 richens fuel supplied to the cylinder that exhausted cylinder contents without the waste gate position changing as much as expected while the waste gate current changed within an expected range. In some examples, the timing that spark is delivered to the cylinder is also adjusted. Engine cylinder misfire is not indicated at 422 because one way to determine engine misfire (e.g., waste gate position) may be more sensitive than the other way to determined engine misfire at the present engine operating conditions. In other examples, misfire may be indicated when established only by waste gate position or waste gate current. Thus, compensation is provided to adjust cylinder operation away from conditions that may increase the possibility of misfire, yet misfire is not indicated because it is not confirmed by both waste gate current and waste gate position. Spark and fuel delivery to other cylinders that exhaust cylinder contents to provide the desired change in waste gate position remain unchanged. Method 400 proceeds to exit after compensation is provided.

At 424, method 400 provides an indication of misfire in an engine cylinder and richens the air-fuel ratio by an amount that is greater than the amount of richening provided at 432 and 422. The indication of misfire may be in the form of a light or buzzer to the operator. In some examples, spark may also be retarded to reduce the possibility of misfiring. Spark and fuel delivery to other cylinders that exhaust cylinder contents to provide the desired change in waste gate position change and current change remain unchanged. Further, the amount of spark energy delivered may be increased by increasing the ignition coil dwell time (e.g., charging the ignition coil for a longer period of time). Additionally, cam timing adjustments to intake and/or exhaust cams may be made to a cam phase actuator at 424 to reduce the possibility of misfire. In some examples, cam timing may be advanced while in other examples cam timing may be retarded to increase the effective compression ratio of the cylinder. The cam timing adjustments to retard or advance are based on the base cam timing. Finally, in some examples, an indication of misfire from the waste gate position and/or waste gate current may be compared with misfire indication based on engine speed. If the waste gate indication of misfire agrees with the engine speed indication of misfire, actuator adjustments and notification of the driver may be provided. Method 400 proceeds to exit after cylinder misfire is indicated and fuel and/or spark are adjusted to compensate for the misfire.

Thus, the method of FIG. 4 provides for a method for operating an engine, comprising: adjusting an actuator to adjust a pressure in a cylinder in response to a position of a waste gate during a blow-down portion of a cycle of the cylinder. The method includes where the blow-down portion of the cycle of the cylinder is during a crankshaft interval where an exhaust valve of the cylinder is open. The method includes where the actuator is an ignition system. The method includes where the ignition system is adjusted to adjust timing of when spark is delivered to the cylinder. The method of includes where the actuator is a cam phase actuator. The method includes where the cam phase actuator adjusts exhaust valve timing. The method includes where the actuator is a fuel injector. In this way, engine misfire may be detected and compensated by increasing cylinder pressure in the cylinder exhibiting misfire by adjusting cylinder air amount, cylinder fuel amount, or spark advance delivered to the cylinder.

The method of FIG. 4 also includes a method for operating an engine, comprising: supplying a current to a waste gate actuator to correct a position of a waste gate during a blow-down portion of a cycle of a cylinder; and adjusting an actuator to adjust a pressure in the cylinder in response to the current. The method includes where the current is determined via a shunt resistor. The method further comprises adjusting the actuator to adjust the pressure in the cylinder in response to the position of the waste gate during the blow-down portion of the cycle of the cylinder. The method includes where the actuator is a cam phaser. The method includes where the cam phaser adjusts an opening timing of an exhaust valve. The method includes where the actuator is a fuel injector and further comprising increasing an opening time of the fuel injector in response to the current being lower than a threshold. The method of includes where the actuator is an ignition system and further comprising increasing an amount of spark energy delivered to a spark plug in response to the current being lower than a threshold.

The method of FIG. 4 also provides for a method for operating an engine, comprising: generating a misfire during a cycle of a cylinder; adjusting a current supplied to a waste gate actuator in response to the misfire to correct a position of a waste gate during a blow-down portion of the cycle of the cylinder; and adjusting an actuator to reduce a possibility of misfire in the cylinder during a subsequent cycle of the cylinder. The method includes where the actuator is a fuel injector, and further comprising increasing an amount of fuel injected to the cylinder via the fuel injector during the subsequent cycle of the cylinder. The method also includes where the blow-down portion of the cycle of the cylinder is from an exhaust valve opening time to an exhaust valve closing time. The method includes where the actuator is an ignition system, further comprising retarding timing of a spark delivered to the cylinder. The method further comprises notifying an operator of the misfire in response to an amount of the current correcting the position of the waste gate. In some examples, the method includes where the current is monitored via a shunt resistor in a circuit supplying electrical energy to the waste gate actuator.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
adjusting an engine actuator to adjust a pressure in a cylinder in response to a position of a waste gate during a blow-down portion in a cycle of the cylinder indicative of an engine misfire during an engine start, the position indicated by waste gate actuator current.

2. The method of claim 1, where the blow-down portion in the cycle of the cylinder is during a crankshaft interval where an exhaust valve of the cylinder is open.

3. The method of claim 1, where the engine actuator is an ignition system, the method further comprising in response to the engine start, positioning the waste gate for the start and then identifying cylinder misfire in response to monitoring of the position during the blow-down portion in the cylinder cycle.

4. The method of claim 3, where the ignition system is adjusted to adjust timing of when spark is delivered to the cylinder.

5. The method of claim 1, where the engine actuator is a cam phase actuator.

6. The method of claim 5, where the cam phase actuator adjusts exhaust valve timing.

7. The method of claim 1, where the engine actuator is a fuel injector, the adjusting including enriching fuel injection during the engine start, the position of the waste gate indicative of misfire including a waste gate current not increasing to an expected level during the cylinder blow-down portion.

8. A method for operating an engine with a turbocharger, comprising:
during engine starting, identifying a cylinder misfire responsive to current of a waste gate actuator of the turbocharger detected during a cylinder blow-down; and
adjusting a fuel injection amount injected to a subsequent cylinder via an injector responsive to the identified cylinder misfire.

9. The method of claim 8, where the cylinder blow-down includes where an exhaust valve of the cylinder is open.

10. The method of claim 8, the method further comprising responsive to the engine start, positioning a waste gate for the start and then identifying cylinder misfire via the current.

11. The method of claim 8, where the adjusting includes enriching fuel injection during the engine start, the current indicative of misfire including a waste gate current not increasing to an expected level during the cylinder blow-down.

12. A method for operating an engine, comprising:
generating a misfire during a cycle of a cylinder;
adjusting a current supplied to a waste gate actuator in response to the misfire to correct a position of a waste gate during a blow-down portion in the cycle of the cylinder; and
adjusting fuel injection amount responsive to the current to reduce a possibility of misfire in the cylinder during a subsequent cycle of the cylinder.

13. The method of claim 12, where adjusting fuel injection amount includes adjusting a fuel injector actuator, the method further comprising increasing an amount of fuel injected to the cylinder via the fuel injector during the subsequent cycle of the cylinder.

14. The method of claim 12, where the blow-down portion in the cycle of the cylinder is from an exhaust valve opening time to an exhaust valve closing time.

15. The method of claim 12, further comprising adjusting an ignition system actuator during the subsequent cycle of the cylinder, including retarding timing of a spark delivered to the cylinder.

16. The method of claim 12, further comprising notifying an operator of the misfire in response to the current supplied to the waste gate correcting the position of the waste gate.

17. The method of claim 12, where the current is monitored via a shunt resistor in a circuit supplying electrical energy to the waste gate actuator.

* * * * *